(No Model.)
W. W. HALLETT.
DEVICE FOR INSTRUCTION IN READING AND CALCULATING.
No. 462,405.  Patented Nov. 3, 1891.
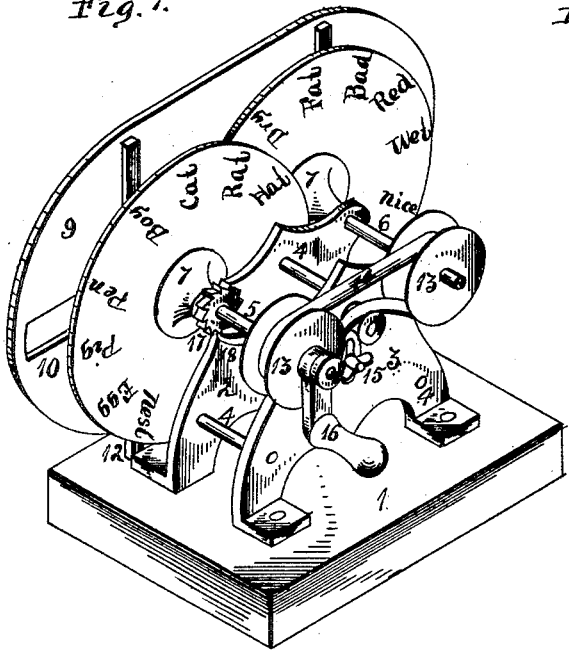
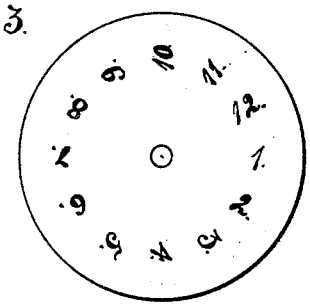
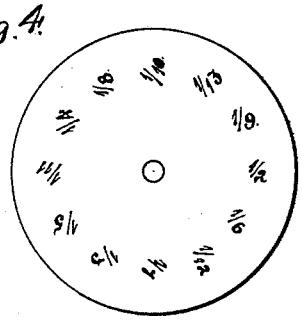
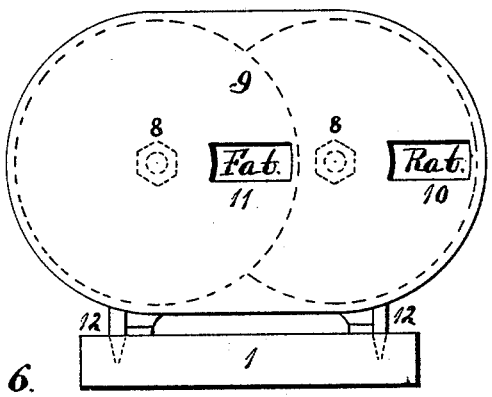
Witnesses:
E. Behel
L. L. Miller
Inventor:
William W. Hallett.
By A. O. Behel
Atty.

UNITED STATES PATENT OFFICE.

WILLIAM W. HALLETT, OF LEE, ILLINOIS.

DEVICE FOR INSTRUCTION IN READING AND CALCULATING.

SPECIFICATION forming part of Letters Patent No. 462,405, dated November 3, 1891.

Application filed May 23, 1891. Serial No. 393,905. (No model.)

*To all whom it may concern:*

Be it known that I, WILLIAM W. HALLETT, a citizen of the United States, residing at Lee, in the county of Lee and State of Illinois, have invented certain new and useful Improvements in Devices for Instruction in Reading and Calculating, of which the following is a specification.

My invention relates to that class of charts wherein one printed word, figure, letter, or character is moved in relation to the other to produce different and almost infinite combinations of figures and words. The advantage of this will be apparent to those conversant with the needs of the primary teacher, where novelty and readiness are important factors in securing interest and attention.

The tendency of modern primary instruction, which is toward teaching to the beginner a considerable vocabulary of nouns, adjectives, and verbs, and finally building them into simple sentences, also the addition, subtraction, multiplication, and division of simple numbers, finds a very efficient device in my machine, by means of which this idea is carried forward in a practical and entertaining manner.

In the accompanying drawings, Figure 1 is an isometrical representation of my reading and calculating machine as seen from the rear. Fig. 2 is a front elevation of the same. Fig. 3 represents one of the reversible interchangeable disks, upon the faces of which are printed numbers. Fig. 4 is a disk bearing fractions. Fig. 5 represents a disk upon which are printed simple words. Fig. 6 is a blank disk made of slate or its surface slated and ruled to allow for the reception of any matter that may be desirable to present to the learners.

In the construction of my machine I have first secured a wooden base-piece 1, and upon this I mount a frame, as shown in Fig. 1. This frame, it will be seen, is composed of two parts 2 and 3, each having two feet, and a screw passing through a hole in each foot secures the frame to the wooden base. The two parts or sides of the frame are further held in their relative positions by three metallic rods 4, which pass between the two parts. At each end of the frame, in the upper part, I journal shafts 5 and 6, which extend somewhat beyond the two faces of the frame. I place a collar 7 on each shaft outside the frame and on its forward side. On the forward end of each shaft I mount one of the disks shown in Figs. 3 to 6, inclusive, and the shafts being too close to allow the disks to stand abreast I place the one on shaft 5 slightly in the rear of the one on shaft 6, and the collar 7 on shaft 5 is made shorter than the other to provide for this. To secure the disks on their shafts and to allow a ready removal in changing one style of disk for another, I thread each shaft at its end, and screwing nuts 8 against the faces of the disks holds them in position on the shafts. Now, as two words or numbers only are to be presented at one time to the pupil, I place a screen 9 before the two charts, which screen is provided with apertures 10 and 11 at proper places in its face to permit those words or numbers to be seen by the learner. This screen is provided at its lower edge with two pins 12, which set into holes in the base and support the screen in its position. It may be desirous to write a portion of a sentence on the screen, which sentence is to be completed by the words presented at the apertures when the charts are revolved, and to provide for this I make the screen of slate or cover it with some slating-paint or material on which I am enabled to write with chalk that portion of a sentence I may desire; also, when the charts bearing figures are placed on the shafts, the sign of addition, subtraction, multiplication, or division is to be written on the screen between the apertures, and this I can do if the screen is slated, as before described.

To provide for the rotation of the charts, I place on the rear end of each shaft, outside the frame-work, a sheave 13, each being firmly affixed to its respective shaft. Over these two sheaves I run a belt 14, and this belt is made long enough that it may be run straight or crossed to reverse the direction of the disks, and thus to change the order of presentation of the combinations of words or figures as seen through the apertures in the screen when the disks are revolved. The belt being long enough to cross, will be slack when run straight, and a tightener 15 is necessary to secure the required friction between the belt and the sheaves. The shaft 5, extending beyond the sheave 13, receives a crank 16 at its outer end. To hold the disks in place at each partial revolution, I affix to the shaft 5, inside the frame and near its forward side, a ratchet-wheel 17 and pivot on the frame a spring-dog, which engages the teeth of the ratchet.

The matter on the disks may be printed on both of their faces, as shown in Figs. 1 and 2, or, they being made of slate or their faces slated, new matter may be written upon them at pleasure. I have contemplated making some of them permanently printed and furnishing others slated and ruled, upon which matter may be written to suit the exact requirements of the learners, thus allowing even a greater variety in the exercises than could be attained if the teacher were limited to the printed disks alone.

It is obvious that pictures on one disk may be made to coincide with the name of the thing illustrated on the other and still fall within the spirit of my invention.

I claim as my invention—

A device for instruction in reading and calculating, comprising a frame, shafts journaled in said frame, said shafts having a belt connection, disks removably fastened on said shafts, a screen to cover portions of the faces of the disks, a ratchet on one shaft to limit its movement to one direction, a crank rigidly attached to one of said shafts, and a belt-tightener secured to said frame.

WILLIAM W. HALLETT.

Witnesses:
W. E. CHANDLER,
T. P. DALTON.